Jan. 27, 1953 E. C. WEISKOPF 2,627,019
REMOVABLY ATTACHABLE LAMP MOUNTING
Filed Nov. 27, 1948 2 SHEETS—SHEET 1
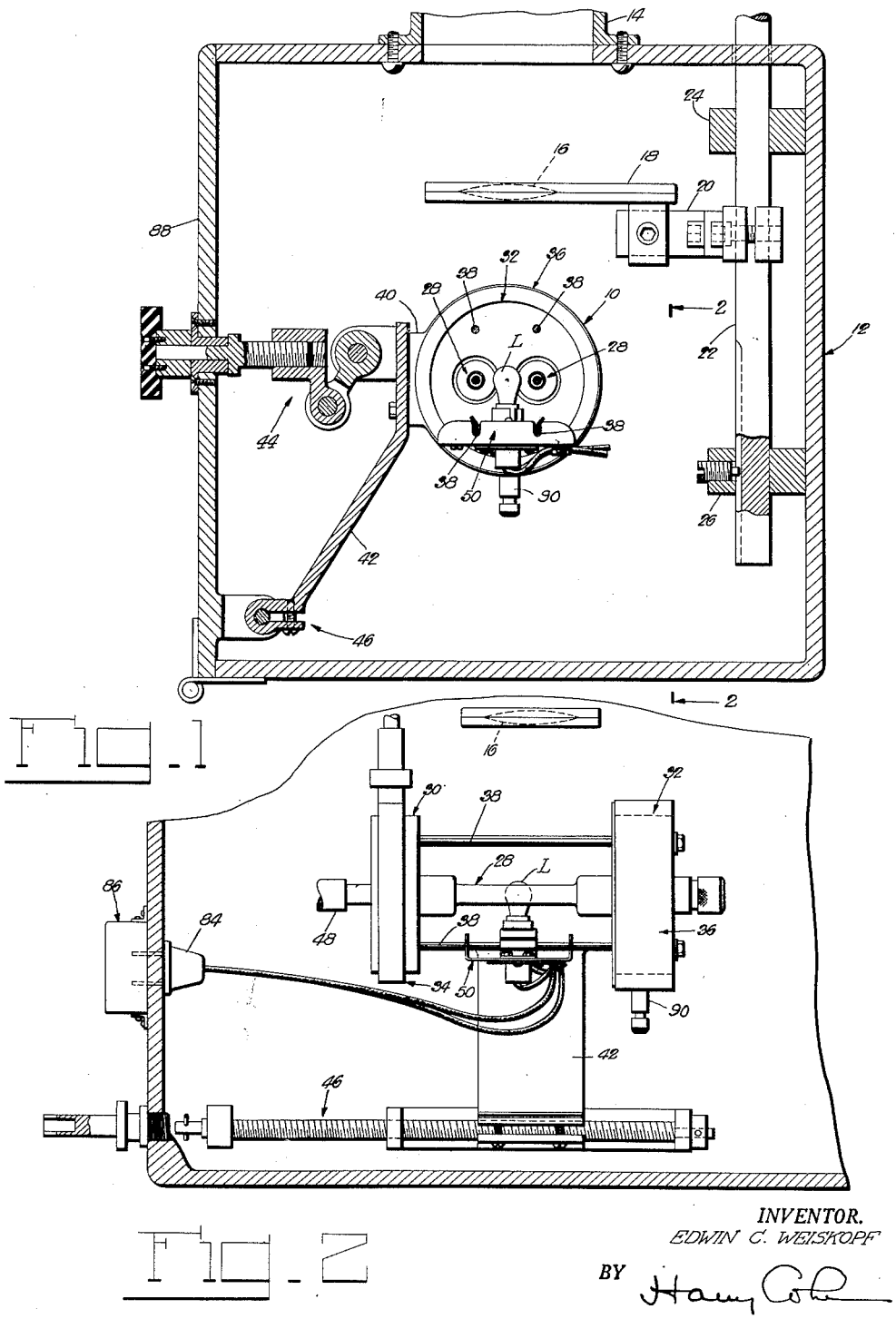
INVENTOR.
EDWIN C. WEISKOPF
BY Harry Cohn
ATTORNEY.

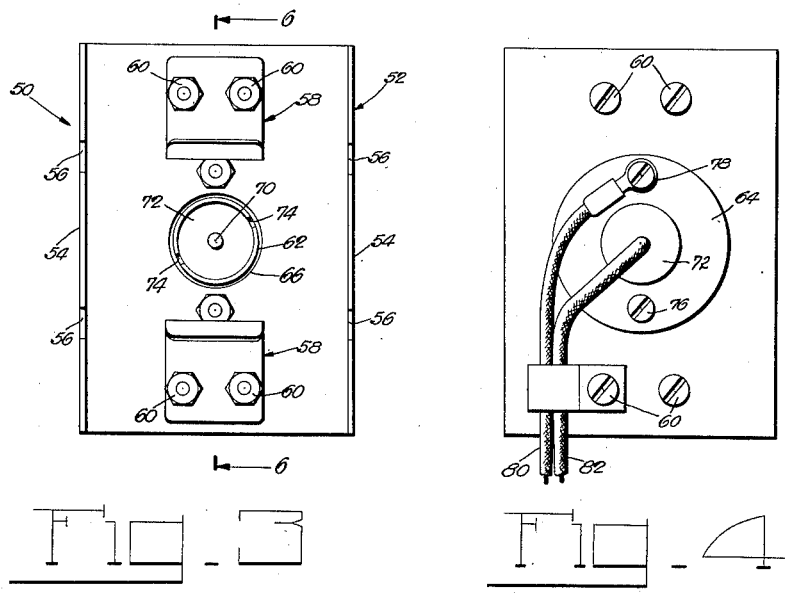
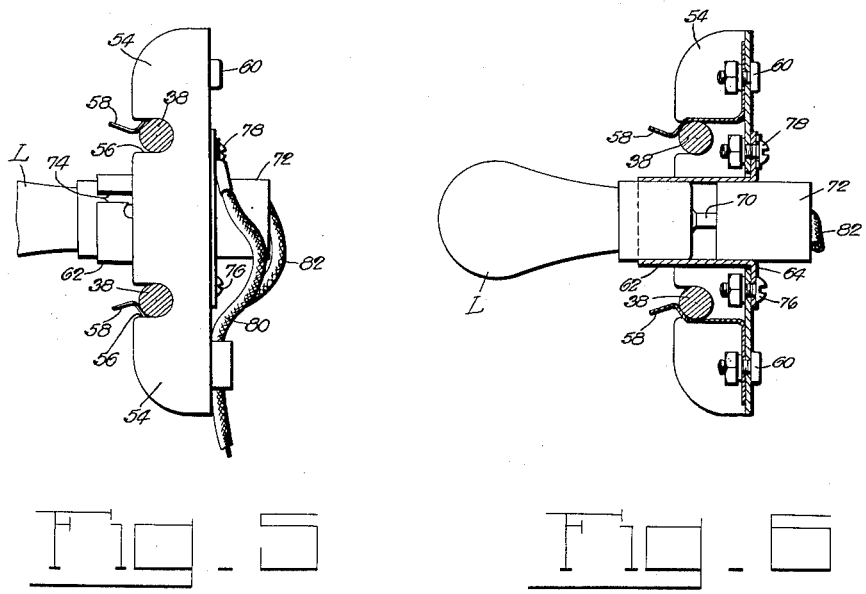

Patented Jan. 27, 1953

2,627,019

UNITED STATES PATENT OFFICE 2,627,019

REMOVABLY ATTACHABLE LAMP MOUNTING

Edwin C. Weiskopf, New York, N. Y., assignor to Scopicon, Inc., New York, N. Y., a corporation of New York Application November 27, 1948, Serial No. 62,403

3 Claims. (Cl. 240—37)

The present invention relates to projectors for microscopes and other magnifying devices, and more particularly to lamp mountings for use with the projectors when taking a micro-photograph or other enlargement.

Micro-projectors of the type to which the present invention is especially well adapted, are shown by my U. S. Patents Nos. 2,435,299 and 2,435,300, and by my pending applications Serial No. 693,292 filed August 27, 1946, now Patent No. 2,477,396, and Serial No. 734,585 filed March 14, 1947, now Patent No. 2,569,876. In the microprojection apparatus shown by these patents and applications, there is utilized, as the light source for micro-projection purposes, a mercury vapor lamp, and as explained in my said Patent No. 2,477,396, when it is desired to take colored photographs of the slide or other transparent or other objects magnified by the microscope or other magnifying devices, as the case may be, an incandescent lamp is utilized in the housing of the light projector instead of the mercury vapor lamp.

It is a particular object of the present invention to provide a lamp mounting constructed and arranged to be readily placed in an operative position within the housing of the light projector without removing the mercury vapor lamp from said housing. In its presently preferred form, the lamp mounting of this invention is designed for use with the multiple lamp apparatus shown and claimed in my said Patent No. 2,569,876, and the provision of a lamp mounting adapted to be readily attached to and removed from said multiple lamp mounting, constitutes one of the objects of this invention.

The above and other objects, features and advantages of this invention, will be fully understood from the following description considered in connection with the accompanying illustrative drawings.

In the drawings:

Fig. 1 is a vertical sectional view of a light projector, showing the multiple lamp mounting with parts in section, and showing the lamp mounting of the present invention attached to the multiple lamp mounting;

Fig. 2 is a view, partly in elevation and partly in section, of the assembly as seen from the line 2—2 of Fig. 1;

Fig. 3 is a front view, in elevation, of the lamp mounting of the present invention;

Fig. 4 is a view of the back of said mounting;

Fig. 5 is a side view of the lamp mounting;

Fig. 6 is a sectional view on the line 6—6 of Fig. 3.

Referring now to the drawings in detail, the multiple lamp device 10, which is described in detail in my above mentioned Patent No. 2,569,876, is shown mounted in a lamp housing 12 of a light projector. Said housing is provided with a light outlet 14 and a condensing lens 16, which is adjustable axially of outlet 14 toward and away from the operative lamp of the device 10. The lens holder 18 is carried by a bracket 20 which is fixed to and is movable with a rod 22, the latter being mounted for longitudinal movement in aligned guide bearings 24 and 26. Rod 22 may be adjusted in any suitable way, preferably by the mechanism shown and described in my Patent No. 2,477,396, and the lamp housing is also preferably of the construction shown in my said patent.

The multiple lamp device 10 comprises a plurality of tubular lamps 28 clamped between the circular members 30 and 32, which are in turn mounted for unitary rotary movement about their common axis, in the mounting members 34 and 36, as described in my Patent No. 2,569,876, and said members 30 and 32 are held in assembled relation with the lamps 28 by means of rods 38. Mounting member 36 is provided with an integral part 40 by which said mounting member is secured to the adjustable support or bracket 42, which is adjustable laterally of the axis of lens 16, and in a direction longitudinally of the tubular lamps 28 by the mechanisms 44 and 46 respectively, as described in my above mentioned Patent No. 2,435,300. Lamps 28 are provided with water cooling jackets and one of the water tubes is therefore indicated at 48. It will be understood that device 10 and the mounting thereof in housing 12, have been described briefly and only to the extent required to explain the presently intended specific use of the lamp mounting of the present invention, which will now be specifically described.

Figs. 1 and 2 show the lamp mounting 50 supported in position on the lamp mounting 10, and Figs. 3 to 6 inclusive show the lamp mounting 50 more in detail. It will be noted that in the operative position of lamp mounting 50, the latter is supported by two of the laterally spaced rods 38 of device 10, and that the rotary unit which consists of the members 30 and 32 and said rods 38 is turned in the mounting members 34 and 36 to the position illustrated by Figs. 1 and 2 in which the incandescent lamp L of the lamp mounting 50 confronts lens 16 and is in position for transmitting light through the space between lamps 28 to lens 16 and through the light outlet 14. In this position of the parts the lamps 28 are inoperative, and it will be understood that in the ordinary use of the apparatus for microprojection purposes, other than for the purpose of taking colored photographs, mounting 50 is removed from device 10 and the lamps 28 are positioned at right angles to the position illustrated in Figs. 1 and 2, so that the uppermost lamp 28 in such position, is operative for transmitting light through lens 16 and light outlet 14.

Referring now more particularly to lamp mounting 50, the latter comprises a plate 52 which may be formed of sheet metal or of any other suitable material. The said plate 52 is provided with laterally spaced parts or flanges 54 having recesses 56 to receive the rods 38 at opposite sides, respectively, of the lamp L, as shown in Figs. 5 and 6. It will be noted that the mounting 50 is U-shaped in cross-section, the plate 52 being the base or bight thereof and the flanges 54 being the spaced arms upstanding from said base. Resilient clamping members 58 are attached to plate 52 in any suitable way as by screws 60, in position between parts 54 and at opposite sides, respectively, of the lamp socket. As shown by Figs. 5 and 6, when plate 52 is mounted in position on a pair of rods 38, clamping members 58 resiliently engage with the companion rods 38 for releasably holding the lamp mounting 50 in position. It will be understood that mounting 50 may be moved longitudinally of the rods 38 on which it is mounted, so that said mounting member may be positioned approximately as desired, that by operation of mechanism 46 mounting 50 may be adjusted in one direction in relation to lens 16, and that by operation of the mechanism 44 said mounting 50 may be adjusted in a different direction in relation to said lens.

The socket for the lamp L comprises the metal tube or shell 62, which is fixed to a metal disk 64. Shell 62 projects through an opening 66 in plate 52 and flange or disk 64 is secured to said plate in any suitable way as by screws 76 and 78. The center contact 70 for the lamp is carried by an insulation member 72. As here shown, tube 62 of the lamp socket is provided with bayonet slots 74 which are engaged by the usual pin projections of the lamp base for holding said lamp in the lamp socket, as will be readily understood. The socket tube 62 may be of the screw shell type. The lamp socket, being fixed to disk 64, is held on plate 52 by the aforementioned screws 76 and 78, and the last mentioned screw may constitute a terminal for the conducting wire 80, the companion wire 82 being electrically connected to the center contact 70. Wires 80 and 82 terminate in a quick detachable connector plug 84 for connection to an outlet receptacle 86, which is mounted as shown in Fig. 2 on the side of lamp housing 12 externally thereof. Said receptacle communicates with the interior of housing 12 through the adjacent wall thereof. It will be understood that when it is desired to place lamp mounting 50 in position within the housing 12 or to remove said mounting from said housing, access to interior of the housing is obtained through the releasable closure 88 of the lamp housing. The receptacle 86 may be provided with a rheostat, step-down transformer and a voltmeter for applying a predetermined lower voltage to lamp L from a 110 volt line as described in my said Patent No. 2,477,396, lamp L being a low voltage lamp and over-excited as described in said patent. A releasable spring-pressed stop pin 90 holds member 32 in adjusted position as described in my Patent No. 2,569,876.

Thus it is seen that the lamp mounting from the present invention and the combination thereof with the device 10 of the lamp projector, are well adapted to accomplish the purposes and objects of the present invention. It will be understood, however, that various changes in the details and construction and in the form and arrangements of parts may be made, and that the lamp mounting of the present invention may be used for various purposes other than that herein specifically illustrated or described, without departing from the underlying idea or principles of this invention within the scope of the appended claims.

Having thus described my invention, what I claim and desire to secure by Letters Patent of the United States is:

1. A lamp mounting adapted to be releasably secured to a support which is provided with a pair of laterally spaced rods, said mounting comprising a plate provided with a lamp socket, laterally spaced flanges on said plate disposed at opposite sides, respectively, of said socket and provided with aligned recesses to receive said rods when the mounting is assembled therewith, and resilient members disposed on said plate at opposite sides, respectively, of said socket in the space between said flanges and positioned to engage said rods, respectively, for releasably securing said plate thereto.

2. A lamp mounting adapted to be releasably secured to a support which is provided with a pair of laterally spaced rods, said mounting comprising a plate provided with a lamp socket, laterally spaced flanges on said plate disposed at opposite sides, respectively, of said socket and provided with aligned recesses to receive said rods when the mounting is assembled therewith, and clamping members mounted on said plate at opposite sides, respectively, of said socket in the space between said flanges and positioned in alignment with said aligned recesses for engaging said rods, respectively.

3. A lamp mounting adapted to be releasably secured to a support which is provided with a pair of laterally spaced rods, said mounting comprising a U-shaped member, a lamp socket mounted on the bight of said member between the upstanding arms thereof, said arms being provided with aligned recesses to receive said rods when the mounting is assembled therewith, and clamping members mounted on said bight at opposite sides, respectively, of said socket in the space between said arms and positioned in alignment with said aligned recesses for engaging said rods, respectively.

EDWIN C. WEISKOPF.

REFERENCES CITED

The following references are of record in the file of this patent:

UNITED STATES PATENTS

| Number | Name | Date |
|---|---|---|
| 1,136,580 | Bergener | Apr. 20, 1915 |
| 1,735,334 | Owens | Nov. 12, 1929 |
| 2,210,537 | Huebner | Aug. 6, 1940 |
| 2,295,046 | Noel | Sept. 8, 1942 |

FOREIGN PATENTS

| Number | Country | Date |
|---|---|---|
| 2,375 | England | of 1907 |
| 42,031 | Sweden | Feb. 14, 1917 |